United States Patent [19]
Tomita

[11] Patent Number: 4,545,257
[45] Date of Patent: Oct. 8, 1985

[54] ELECTROMAGNETIC FLOW METER

[75] Inventor: Toyofumi Tomita, Tokyo, Japan

[73] Assignee: Tokyo Shibaura Denki Kabushiki Kaisha, Kawasaki, Japan

[21] Appl. No.: 535,401

[22] Filed: Sep. 23, 1983

[30] Foreign Application Priority Data

Sep. 30, 1982 [JP] Japan ................................ 57-171879

[51] Int. Cl.⁴ .............................................. G01F 1/60
[52] U.S. Cl. ............................................... 73/861.17
[58] Field of Search ........................ 73/861.17, 861.16

[56] References Cited

U.S. PATENT DOCUMENTS

| | | |
|---|---|---|
| 4,206,641 | 1/1980 | Takada . |
| 4,227,408 | 10/1980 | Schmoock . |
| 4,303,980 | 12/1981 | Yard ................................ 73/861.17 |
| 4,409,846 | 10/1983 | Veno ................................ 73/861.17 |

FOREIGN PATENT DOCUMENTS

| | | |
|---|---|---|
| 1445188 | 8/1976 | United Kingdom . |
| 1502860 | 3/1978 | United Kingdom . |
| 1586417 | 3/1981 | United Kingdom . |

Primary Examiner—Herbert Goldstein

Attorney, Agent, or Firm—Oblon, Fisher, Spivak, McClelland & Maier

[57] ABSTRACT

An electromagnetic flow meter has a flow rate detector and a pulse width modulating circuit. The detector includes an exciting coil. The coil is excited by a square wave exciting current, thus inducing a voltage in a fluid. The voltage is picked up and used as a flow rate signal. The pulse width modulating circuit amplifies the flow rate signal, and also inverts and then amplifies the signal, thus providing an amplified flow rate signal and an inverted, amplified flow rate signal. The circuit further samples one of these signals, thereby generating a pulse signal whose width is proportional to the flow rate signal. The flow meter further comprises a timing control circuit. This circuit generates a first control signal frequency of either 50 Hz or 60 Hz divided by an even number and a second control signal. The first control signal controls the elements of the flow rate detector and pulse width modulation circuit. The second control signal controls the pulse width modulation circuit in such a manner that the circuit samples said signal repeatedly, each time for a predetermined period equal to the reciprocal of the other of 50 Hz or 60 Hz.

6 Claims, 13 Drawing Figures

ELECTROMAGNETIC FLOW METER

BACKGROUND OF THE INVENTION

The present invention relates to an electromagnetic flow meter having a coil excited by a square wave exciting current or a trapezoidal wave exciting current, and more particularly to an electromagnetic flow meter wherein the excitation frequency and sampling time are improved.

Figure 1:
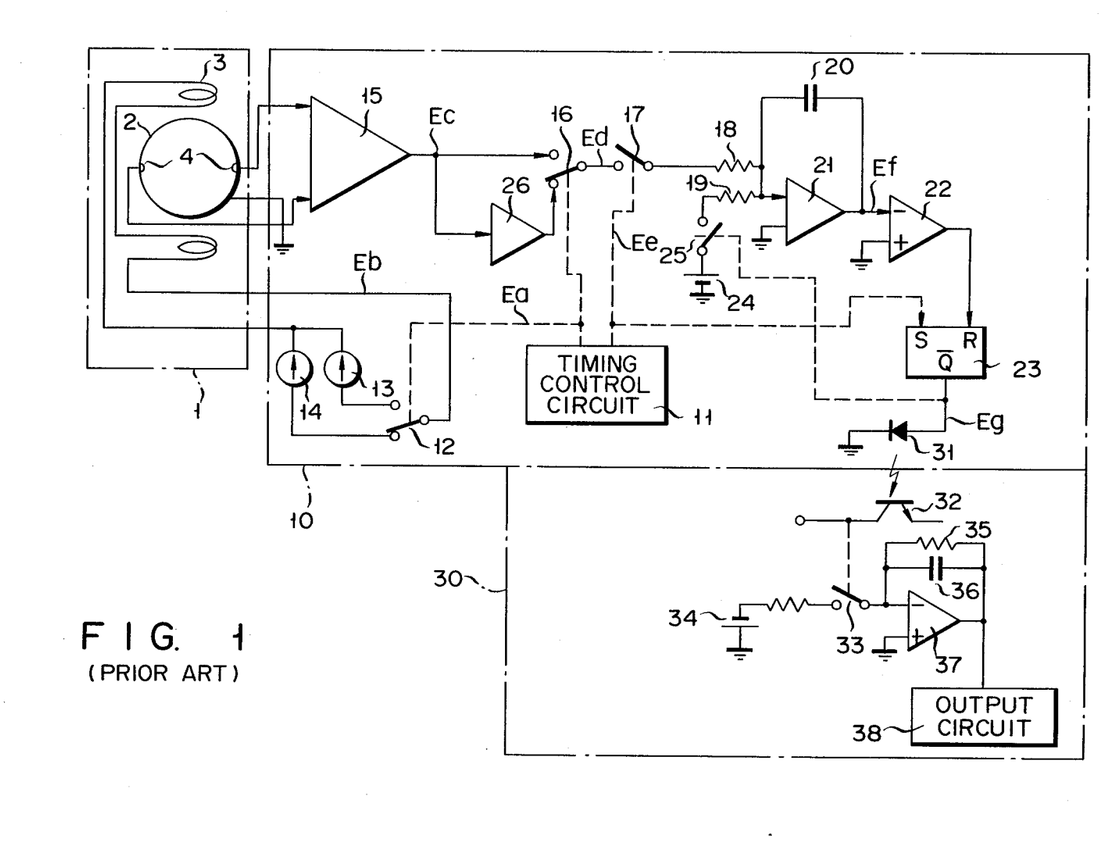
FIG. 1 shows a conventional electromagnetic flow meter having a coil which is excited by a square wave excuting current.
Figure 2:
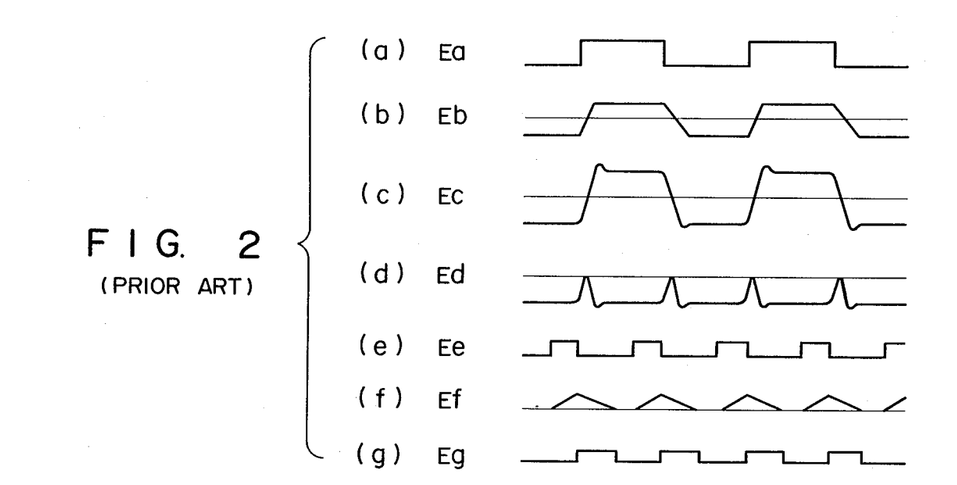
FIG. 2 shows the waveforms of signals supplied to the elements of the flow meter shown in FIG. 1.

FIG. 1 shows an electromagnetic flow meter similar to one disclosed in U.S. Pat. No. 4,206,641. This flow meter is excited by a square wave current. The flow meter comprises a flow rate detector 1, a pulse width modulation circuit 10 and a pulse-width to voltage converter circuit 30. The pulse width modulation circuit 10 produces a pulse having a width proportional to the voltage of the output signal from the flow rate detector 1. The converter circuit 30 smoothes the pulse from the circuit 10 and convert the pulse into a DC analog signal. The flow rate detector 1 is comprised of a conduit 2, an exciting coil 3 and a pair of electrodes 4. These electrodes 4 mutually face and are arranged on the inner periphery of the conduit 2, through which a fluid flows and which magnetic fluxes generated by the coil 3 penetrate at right angles to the flow of the fluid. Two constant current sources 13, 14 are alternately connected to the exciting coil 3 by a switch 12 which is changed over by a switch control signal Ea shown in FIG. 2(a). Hence, the coil 3 is excited by a current Eb having the waveform as shown in FIG. 2(b). When an electrically conductive fluid flows through the conduit 2 under this condition, an electromotive force, which is proportional to the intensity of the magnetic field and the speed of the fluid, will be generated between the electrodes 4 in accordance with Fleming's right-hand rule. This electromotive force is picked up by the electrodes 4 and then amplified by an AC amplifier 15. The output signal Ec of the AC amplifier 15, which is shown in FIG. 2(c), is applied to an inverting amplifier 26 the amplification factor of which is 1. The inverting amplifier 26 inverts the signal Ec. The output signal Ec of the AC amplifier 15 and the output signal of the inverting amplifier 26 are so selected by a switch 16 that a negative voltage is applied to a switch 17 at all times. The switch 16 is changed over by the switch control signal Ea from a timing control circuit 11.

The output signal Ed of the switch 16, which is shown in FIG. 2(d), is supplied to a double integration circuit, which will be described later.

The switch 17 is turned on by the signal Ee from the timing control circuit 11 during the one-cycle period of the commercially available AC current, when the magnetic fluxes become stable, that is, immediately before the switch 12 is changed over. Hence, the switch 17 samples the signal Ed, i.e., the electromotive force, to thereby produce a flow rate signal not containing so-called 90°-shifted noise. A double integration circuit, which comprises resistors 18, 19, a capacitor 20 and an operational amplifier 21, integrates the signal Ed at regular intervals, each time for one-cycle period of the commercially available AC current, thus producing a signal Ef which contains no noise as shown in FIG. 2(f). Then the output signal Ef from the double integration circuit is supplied to a comparator 22. The output signal from the comparator 22 falls from the logical "1" level to the logical "0" level when the signal Ef falls to the zero level. The output signal of the comparator 22 re- sets a flip-flop 23, and the signal Ea from the timing control circuit 11 sets the flip-flop 23. As a result, the flip-flop 23 generates a pulse signal Eg whose width is proportional to the level of the flow rate signal, i.e., the output signal of the comparator 22.

As shown in FIG. 1, the pulse width modulation circuit 10 further comprises a reference power source 24, a switch 25 which is turned on and off by the output $\overline{Q}$ of the flip-flop 23, and a light emitting element 31.

The pulse signal produced by the flip-flop 23 is supplied to the pulse-width to voltage converter circuit 30. More specifically, upon receipt of the pulse signal from the flip-flop 23, the element 31 emits light, which reaches a light-receiving element 32 electrically insulated from the element 31. The element 32 generates an output signal, which turns a switch 33 on and off. The current supplied from a power source 34 to the switch 33 is therefore made into a pulse signal. This pulse signal is smoothed by a smoothing circuit comprised of a resistor 35 and an operational amplifier 37. The output signal from the operational amplifier 37 is supplied to an output circuit 38. The output circuit 38 converts the input signal to a DC analog signal of, e.g., 4 to 20 mA. The power source 34 and amplifier 37 are grounded at a point other than the point at which the amplifier 21, comparator 22, power source 24 and element 31 are grounded.

Figure 3:
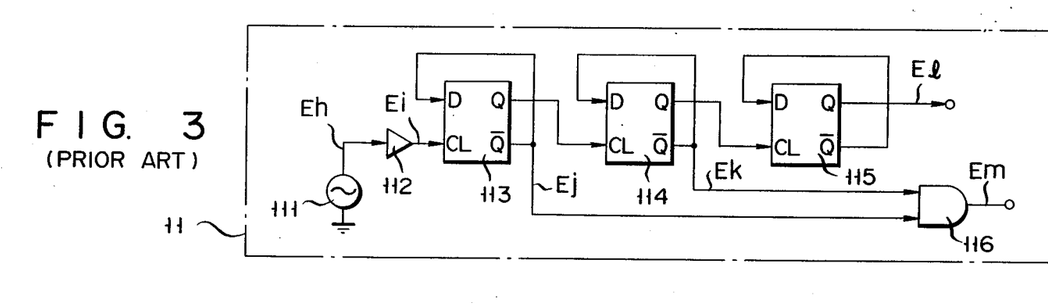
FIG. 3 is a circuit diagram of a timing control circuit used in the flow meter of FIG. 1.
Figure 4:
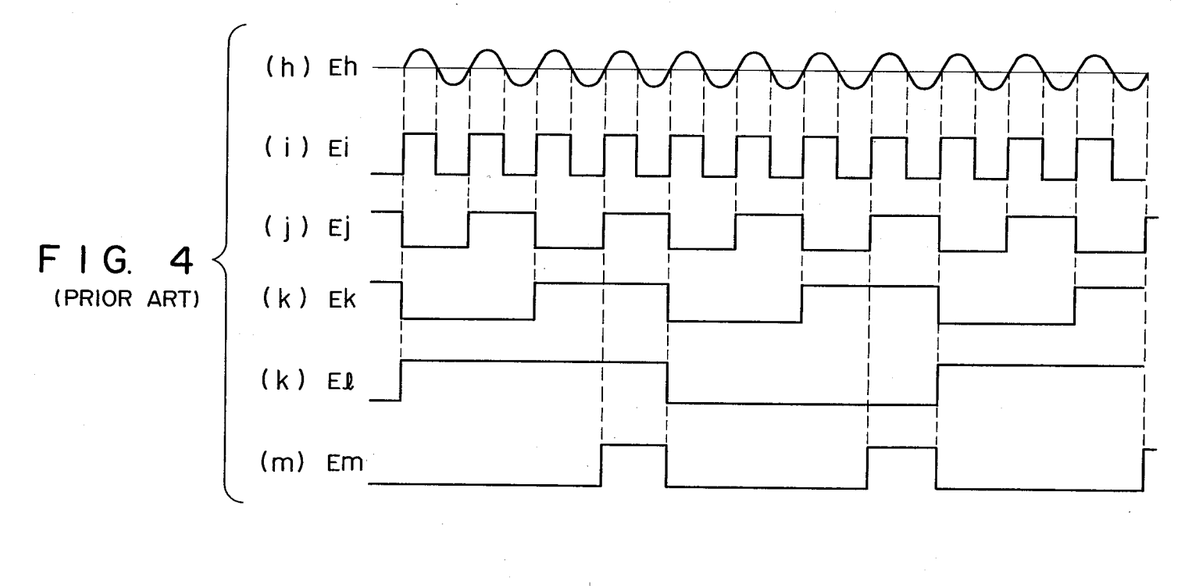
FIG. 4 shows the waveforms of signals supplied to the elements of the timing control circuit shown in FIG. 3.

FIG. 3 is a circuit diagram of the timing control circuit 11 for controlling the switches 12, 16 and 17. In this circuit 11, an output signal Eh of a commercially available power source 111, whose waveform is shown in FIG. 4, is supplied to a buffer circuit 112, which generates a pulse signal Ei shown in FIG. 4. The frequency of the pulse signal Ei is divided by D-type flip-flops 113 to 115, whereby a signal El shown in FIG. 4 is obtained. This signal El is used to control the switches 12 and 16. The output signals from the terminals $\overline{Q}$ of the D-type flip-flops 113, 114, i.e., the signals Ej, Ek shown in FIGS. 4, are supplied to a two-input AND gate 116, which produces an output signal Em shown in FIG. 4. This signal Em is used to control the switch 17. The circuit 11 shown in FIG. 3 can therefore easily generate a pulse signal which is at the high level only for the one-cycle period of the commercially available AC current immediately before the switch 12 is changed over.

The pulse widths of the signals El and Em from the timing control circuit 11 change in accordance with the frequency of the commercially available AC current, 50 Hz or 60 Hz. The timing for sampling the flow rate signal will inevitably change also in accordance with the frequency of the AC current. Although the exciting current is constant, the output signal of the pulse-width to voltage converter circuit 30 will change, though very little, due to the transient phenomena occuring when the switch 12 is changed over, e.g., the deterioration of the responses of the detector 1 and circuits 10, 30, even if the flow rate of the fluid remains unchanged. Why this takes place will be explained with reference to FIG. 5.

Figure 5:
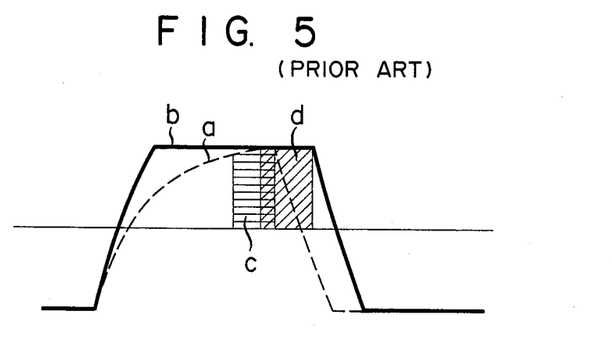
FIG. 5 illustrates the trouble which is made in the flow meter of FIG. 1 when commercially available currents of 50 Hz and 60 Hz are used as exciting currents.
Figure 6:
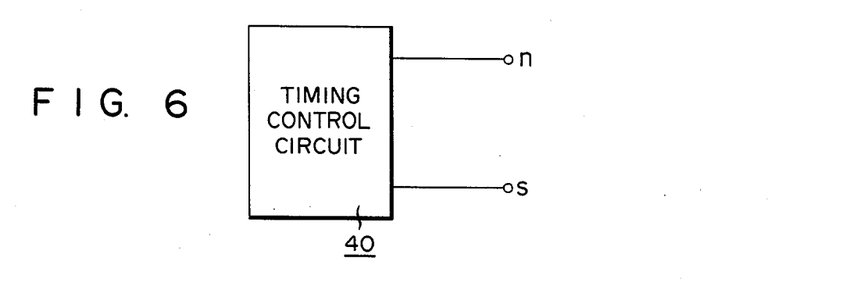
FIG. 6 is a block diagram of a timing control circuit according to the present invention.

In FIG. 5, curve a indicates the waveform of an exciting current of 60 Hz and curve b represents an exciting current of 50 Hz. The horizontally hatched region c represents the sampling period when the excitation current of 60 Hz is supplied to the coil 3. The diagonally hatched region d indicates the sampling period when the exciting current of 50 Hz is supplied to the coil 3. It is clear from FIG. 5 that the current of 60 Hz and the current of 50 Hz are different in magnitude. In other words, the flow rate signal resulting from the current of 60 Hz supplied to the coil 3 is different in magnitude from the flow rate signal resulting from the current of 50 Hz supplied to the coil 3 even if the flow rate of the fluid remains unchanged. When the electromagnetic flow meter is used to detect the flow rate with a high precision, the amplification factor of the circuit 10 or the magnitude of the exciting current must be adjusted in accordance with the frequency of the exciting current. In practice, the amplification factor of the circuit 10 is fixed since it is not economical to use two types of circuits 10, one for 50 Hz AC current and the other for 60 Hz AC current. Hence, it is the magnitude of the exciting current that is changed in accordance with the frequency of the exciting current, 60 Hz or 50 Hz.

The electromagnetic flow meter must therefore be adjusted so that it may be used in a specific region or country, in accordance with the frequency of the AC current which is commercially available in the region or country. This adjustment is troublesome and time-consuming and undesirable from an economical point of view. To put the flow meter to practical use without adjusting it for this purpose, the responses of the flow rate detector 1 and pulse width modulation circuit 10 may be improved. To improve the response of the detector 1, that is, to stabilize the magnetic fluxes quickly, the detector 1 may be so designed that no eddy current flows through it. Alternatively, the voltages applied to the exciting circuit, i.e., the combination of the coil 3 and electrodes 4, and constant current sources 13, 14 are elevated for the same purpose. The first and second methods, however, would require a more complicated and expensive flow rate detector and a larger exciting circuit.

To improve the responses of the detector 1 and circuit 10 is to broaden the frequency band of the circuit 10. In view of the fact that the electromotive generated between the electrodes 4 is small, it is not advisable to broaden the frequency band of the circuit 10 since this method will reduce the S/N ratio of the output signal from the circuit 10. Indeed the noise may be removed from the output signal from the circuit 10 if the switch 17 is on for 100 msec each time, whether the frequency of the commercially available AC current is 50 Hz or 60 Hz. Further, the frequency of excitation may be fixed to raise the S/N ratio of the output signal. Either method, however, will deteriorate the response of the electromagnetic flow meter since the frequency of excitation must be considerably low.

SUMMARY OF THE INVENTION

Accordingly, the object of the present invention is provide an electromagnetic flow meter which uses an exciting current whose frequency is not lower than that of the exciting current used in the conventional flow meter, which is free of troubles resulting from the use of excitation currents of different frequencies, e.g., 50 Hz and 60 Hz, and which produces an output signal containing no noise, which ever commercially available current, i.e., current of 50 Hz or current of 60 Hz, is used as the exciting current.

To achieve the above-mentioned object, an electromagnetic flow meter according to the present invention comprises a flow rate detector including a first switch which is controlled to generate a square wave exciting current, an exciting coil to be excited by the exciting current and a pair of electrodes for picking up the voltage induced by an electrically conductive fluid; a pulse width modulation circuit including a second switch and a third switch, designed as to amplify a flow rate signal from the flow rate detector, thus producing an amplified flow rate signal, invert and amplify the flow rate signal, thus producing an inverted, amplified flow rate signal, select one of these flow rate signals by controlling the second switch, and sample the signal supplied through the second switch, by turning on the third switch repeatedly, each time for a predetermined period of time when the exciting current has normal value, to thereby generate a pulse signal whose width is proportional to the voltage of the flow rate signal; and a timing control circuit for generating a first control signal of a predetermined frequency for controlling the first and second switch and a second control signal for controlling the third switch in such a manner that the flow rate signal supplied through the second switch is sampled each time for said predetermined period.

The electromagnetic flow meter according to the present invention can therefore use an exciting current whose frequency is not lower than that of the exciting current used in the conventional flow meter. Further, the exciting current can have the same magnitude, whichever commercially available current, i.e., current of 50 Hz or current of 60 Hz, it is. Still further, the flow meter can produce an output signal which contains no noise, no matter which commercially available current is used as the exciting current. The flow meter can be used in any region or any country where a current is commercially available.

The elements of the flow meter according to the present invention are designed so as to minimize the difference in magnitude between the flow rate signals produced from exciting currents of 50 Hz and 60 Hz. These elements need not be so designed if the flow meter uses only current of 50 Hz or 60 Hz as exciting current. In this case, it is unnecessary to improve the response of the flow rate detector or to broaden the frequency band of the pulse width modulation circuit, and the flow meter can thus be manufactured at a low cost and the S/N ratio of the pulse width modulation circuit can be raised.

DETAILED DESCRIPTION OF THE PREFERRED EMBODIMENTS

Figure 7:
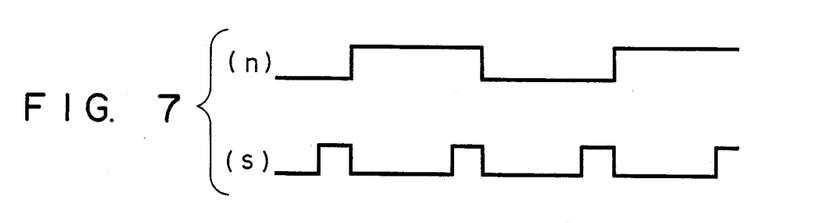
FIG. 7 shows the waveforms of two switch controlling signals generated by the circuit shown in FIG. 6.

One embodiment of the present invention will now be described with reference to FIGS. 6 to 10. This embodiment, i.e., an electromagnetic flow meter, is identical with the known flow meter of FIG. 1, except that it uses a timing control circuit 40 shown in FIG. 6, not the timing control circuit shown in FIG. 3. The circuit 40 is designed so as to generate two switch controlling signals n, s. The signal n controls the switches 12 and 16 both shown in FIG. 1, and the signal s controls the switch 17 shown in FIG. 1. Both signals n and s are pulse signals as shown in FIG. 7. The signal n has a frequency obtained by dividing 50 Hz by an even number. The pulse width of the signals s is 1/60 sec. Alternatively, the signal n may have a frequency obtained by dividing 60 Hz by an even number, and the signal s may have a pulse width of 1/50 sec.

Figure 8:
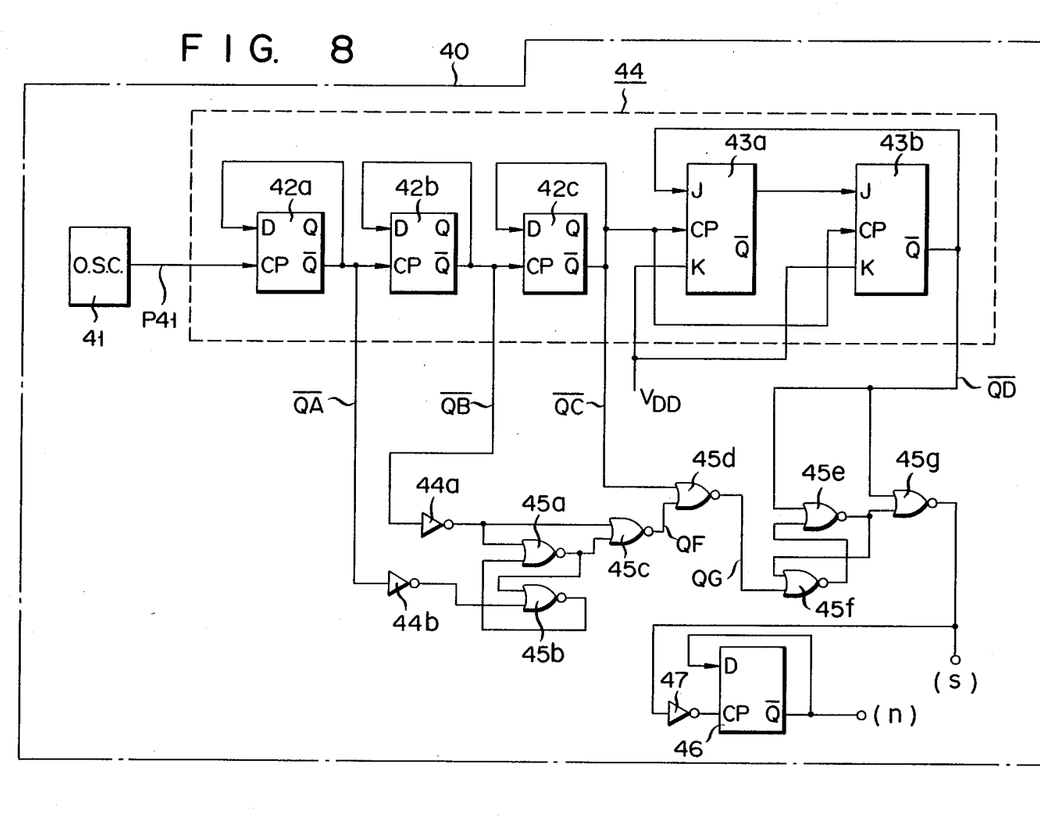
FIG. 8 is a circuit diagram of a timing control circuit, i.e., the principal component of the invention.

FIG. 8 shows a timing control circuit for producing a switch controlling signal n whose frequency is 50/8 Hz and a switch controlling signal s whose pulse width is 1/60 sec.

Figure 9:
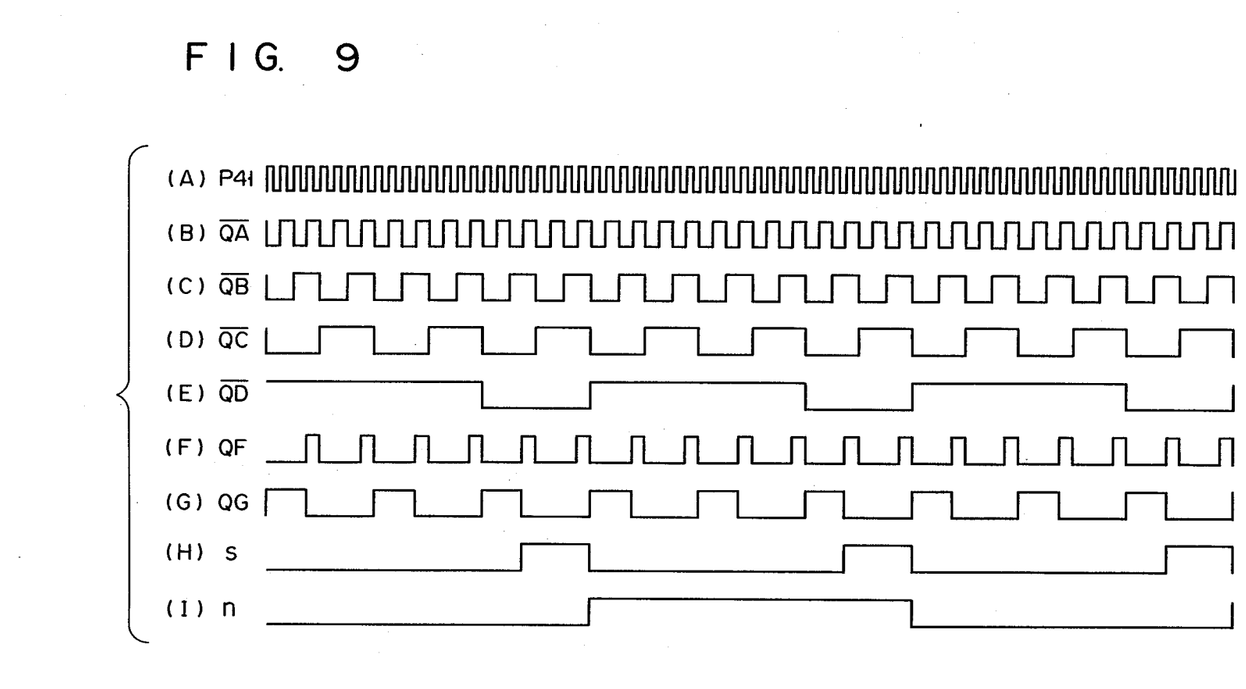
FIG. 9 shows the waveforms of signals supplied to the elements of the circuit shown in FIG. 8.

This timing control circuit 40 comprises a free-running oscillator 41, a frequency dividing circuit 44, a logic circuit comprised of inverters 44a, 44b and NOR gates 45a to 45g, a D-type flip-flop 47 and an inverter 47. The oscillator 41 divides the frequency of a pulse signal generated by, for example, a quartz crystal oscillator, so as to produce a pulse signal P41 of 300 Hz which is shown in FIG. 9. The frequency of this pulse signal P41 is divided by 24 by the frequency dividing circuit 44. The circuit 44 is comprised of D-type flip-flops 42a to 42c and JK-type flip-flops 43a, 43b the K terminals of which are connected to a high voltage source $V_{DD}$. The flip-flops 42a to 42c are of the positive edge trigger type and produce $\overline{Q}$ outputs, i.e., $\overline{QA}$, $\overline{QB}$, $\overline{QC}$ which are shown in FIG. 9. The JK-type flip-flop 43b produces a $\overline{Q}$ output, i.e., $\overline{QD}$ which is also shown in FIG. 9. These outputs $\overline{QA}$, $\overline{QB}$, $\overline{QC}$ and $\overline{QD}$ are supplied to the logic circuit, which generates a switch controlling signal s which is shown in FIG. 9. This signal s has a frequency of 300/24 Hz and an on-period of 1/60 sec, i.e., 5-cycle period of the signal P41. The signal s is supplied to the D-type flip-flop 46, which divides the frequency (i.e., 300/24 Hz of the signal s by 2, thereby generating a switch controlling signal n having a frequency of 50/8 Hz (=300/48 Hz), which is also shown in FIG. 9. Since the D-type flip-flop 46 is of the positive edge trigger type, the signal s is inverted by the inverter 47 and then supplied to the flip-flop 46 as a clock signal. The NOR gates 45c, 45d produce output signals QF and QG, respectively, which are shown in FIG. 9. Since the switches 12, 16 by the signal n and the switch 17 is controlled by the signal s. The flow rate signal can be sampled for a predetermined period, when the magnetic fluxer become stable, that is, immediately before the switch 12 is changed over.

The operation of the electromagnetic flow meter using the timing control circuit 40 shown in FIG. 8 will now be described.

When the switch 12 is changed over by the signal n to select the constant current source 13, a negative voltage will be applied to the output terminal of the AC amplifier 15. At the same time, the switch 16 is turned on by the signal n and samples the output signal Ec from the AC amplifier 15. On the other hand, when the switch 12 is changed over by the signal n to select the constant current source 14, the signal Ec will be at a positive potential and the output signal from the inverting amplifier 26 will be at a negative potential. In this case, the switch 16 will be connected to the output of the inverting amplifier 16. In other words, the switch 16 is changed over so a negative voltage is applied to the switch 17 at all times.

Figure 10:
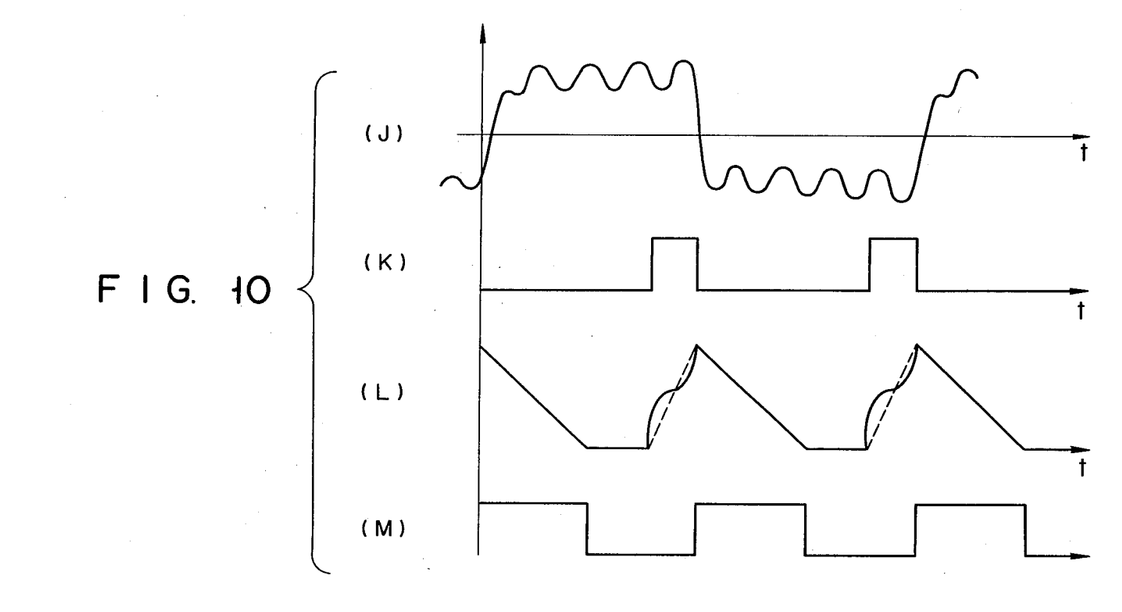
FIGS. 10(J), 10(K), 10(L) and 10(M) illustrate how to remove noises from a flow rate signal produced from a 60 Hz exciting current.

Let us assume that the commercially available AC current of 60 Hz is supplied to the coil 3 and that 60 Hz-noise is induced in the output signal from the flow rate detector 1. FIG. 10(J) shows the output signal Ec from the AC amplifier 15, on which the noise is superposed. This noise is integrated for 1/60 sec., i.e., the one-cycle period of the AC current. Hence, any two immediate half waves of the induced noise cancel out each other. Therefore, the noise does not adversely influence the output signal Ef from the double integration circuit shown in FIG. 1, the waveform of which is illustrated in FIG. 10(L). FIG. 10(K) shows the waveform of the switch controlling signal s. FIG. 10(M) shows the waveform of the output signal Eg from the flip-flop 23.

As shown in FIG. 10(L), the output signal Ef of the double integration circuit will be represented by the broken lines if it is produced when no noise is superposed on the output signal Ec from the AC amplifier 15. Also as shown in FIG. 10(L), the signal Ef reaches the same peak voltage upon the completion of the integration, whether or not noise is superposed on the output signal Ec from the AC amplifier 15. As a result, as shown in FIG. 10(M), the flip-flop 23 produces the same output signal Eg, whose pulse width is proportional to the flow rate of the fluid, whether or not noise is superposed on the signal Ec.

Figure 11:
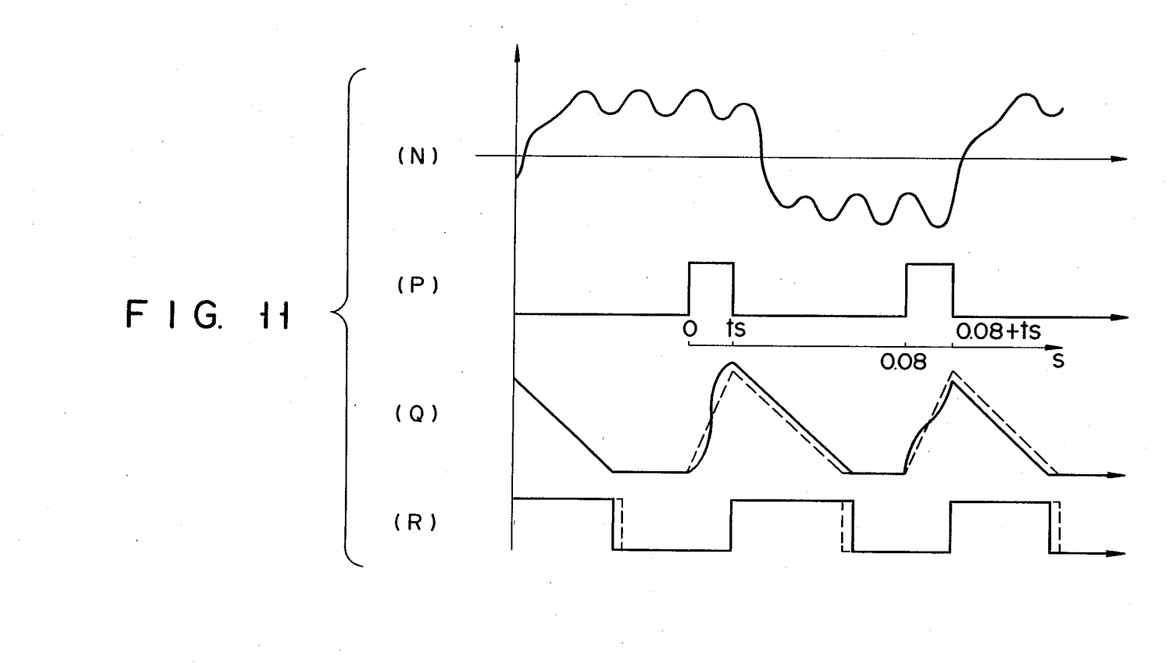
FIGS. 11(N), 11(P), 11(Q) and 11(R) explain how to remove noise from a flow rate signal produced from a 50 Hz exciting cuttent.

Now, let us assume that the commercially available AC current of 50 Hz is supplied to the coil 3 and that 50 Hz noise is induced in the output signal from the flow rate detector 1. In this case, the output signal Ec from the AC amplifier 15 has the waveform as shown in FIG. 11(N). FIG. 11(P) shows the switch controlling signal s. The output signal Ef from the double integration circuit has the waveform as illustrated in FIG. 11(Q). The broken line in FIG. 11(Q) indicates the waveform which the signal Ef will have if no noise is superposed on the output signal Ec from the AC amplifier 15. The output signal Eg from the flip-flop 23 has the waveform as illustrated in FIG. 11(R). The broken lines shown in FIG. 11(R) represent the waveform of the signal Eg which the flip-flop 23 will produce if noise is superposed on the signal Ec from the AC amplifier 15. The pulse width of the signal Eg is proportional to the peak voltage which the signal Ef reaches upon completion of the integration (e.g., sampling) of the output signal Ec from the AC amplifier 15. While the signal Ec is at a positive potential, the output signal from the inverting amplifier 26 is supplied to the double integration circuit shown in FIG. 1. Hence, the influence $\Delta N_{30}$ upon the output signal Eg from the flip-flop 23 is given as follows:

$$\Delta N_+ = -k \int_0^{ts} - \sin(100\pi t + \theta)dt \quad (1)$$

where ts is the sampling time (i.e., 1/60 sec), k is a constant and $\theta$ is the phase of noise at the time of t=0. The sign "−" preceding $\sin(100\pi t+\theta)$ shows that the output signal of the inverting amplifier 26 has been selected. Equation (1) reduces to the following:

$$\Delta N_+ = \frac{2k}{100\pi} \{\sin(50\pi ts + \theta)\sin 50\pi ts\} \quad (2)$$

While the signal Ec shown in FIG. 11(N) is at a negative potential, the influence $\Delta N_-$ upon the output signal Eg from the flip-flop 23 is represented as follows:

$$\Delta N_- = -1k \int_{0.08}^{0.08 + ts} - \sin(100\pi t + \theta)dt \quad (3)$$

$$= \frac{2k}{100\pi} \{\sin(50\pi ts + \theta)\sin 50\pi ts\}$$

$\Delta N_+$ and $\Delta N_-$ may have a positive or negative value in accordance with $\theta$. When $\Delta N_+$ has a positive value, $\Delta N_-$ must have a negative value, and vice versa. Nonetheless, the noise does not adversely influence the signal Eg since the smoothing capacitor 36 smoothes $\Delta N_+$, $\Delta N_-$ as indicated by the following equation:

$$\Delta N_+ + \Delta N_- = 0 \quad (4)$$

As mentioned above, the timing control circuit 40 of FIG. 8 can remove noise from the output signal Ec from the AC amplifier 15, whichever commercially available Ac current is supplied to the flow rate detector 1, 50 Hz-current or 60 Hz-current. It should be noted that the logic circuit comprised of the inverters 44a, 44b and NOR gates 45a to 45g is designed so as to avoid hazards.

If the frequency dividing circuit 44 is comprised of two D-type flip-flops and three JK-type flip-flops and if its frequency division ratio is 1/20, the timing control circuit 40 will then generate a switch controlling signal s whose pulse width is 1/50 sec and whose frequency is 60/4 Hz and a switch controlling signal n whose frequency is 60/8 Hz. In this case, the sampling period is 1/50 sec. When the commercially available 50 Hz-current is used as the exciting current, the induced noise will be integrated for the one-cycle period of this current, i.e., for 1/50 sec, and will eventually be removed. On the other hand, when the commercially available 60 Hz-current is used, the results of integrating the induced noise for 1/50 sec will be given as follows:

$$\Delta N_+ = \frac{2k}{120\pi} \{\sin(60\pi t_t + \theta_1)\sin 60\pi t_t\} \quad (5)$$

$$\Delta N_- = \frac{-2k}{120\pi} \{\sin(60\pi t_t + \theta_1)\sin 60\pi t_t\} \quad (6)$$

$$\Delta N_+ + \Delta N_- = 0 \quad (7)$$

In equations (5), (6), (7), $t_t$ is the sampling time, i.e., 1/50 sec.

The frequency dividing circuit 44 is not limited to the type comprising D-type flip-flop and JK-type flip-flops. It may comprise other kinds of flip-flops and/or other logic elements.

Figure 12:
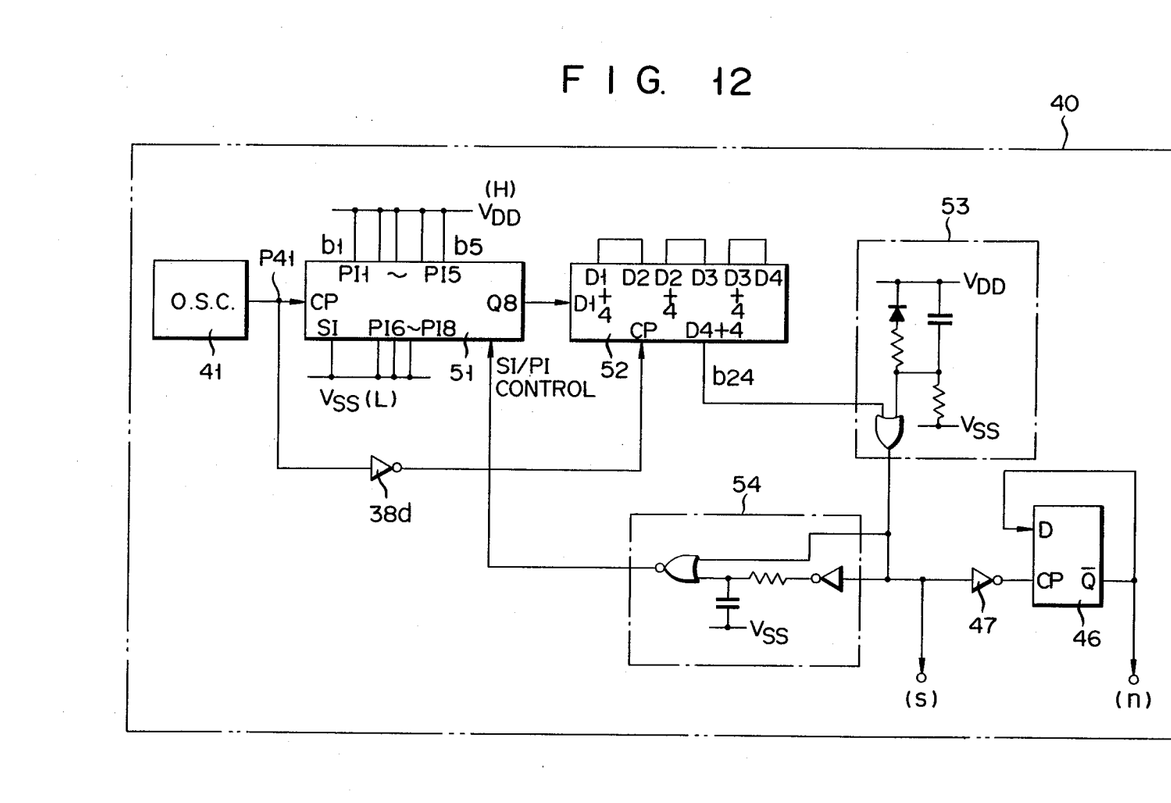
FIG. 12 is a circuiit diagram of another timing control circuit according to the present invention.

FIG. 12 shows another timing control circuit 40 according to the present invention. This circuit 40 includes an 8-bit shift register 51 and an 18-bit shift register 52. The shift register 51 is a parallel-in/serial-out and serial-in/serial-out one, e.g., $C^2MOS$ TC4021BP manufactured by Toshiba. The shift register 52 may be Toshiba's TC4006BP. The shift registers 51, 52 are combined to form a 24-bit shift register. First, an initializing circuit 53 sets the parallel input terminals PI1 to PI5 at the high level and the other parallel input terminals PI6 to PI8 at the low level. The pulse signal is supplied to the shift register 51 from the signal oscillator 41, whereby the contents of the 24-bit shift register (i.e., the combination of the shift register 51, 52) are shifted to the right every 1/300 sec. At the same time, a signal of the "0" level is supplied to the serial-in terminal SI of the shift register 51. The signal delivered from the output terminal $b_{24}$ of the shift register 52 is used as switch controlling signal s. This signal a falls to the low level upon lapse of 1/60 sec (=1/300 sec×5) after it reaches the high level. This falling of the signal s is detected by a serial-in/parallel-in control circuit 54. Upon detecting the signal s, the control circuit 54 sets the shift register 51 to the parallel-in mode. As a result, the parallel input terminals PI1 to PI5 of the register 51 are set at the high level again and the parallel input terminals PI6 to PI18 are set at the low level again.

The sequence of operations, as described in the preceding paragraph is repeated, thereby to produce a switch controlling signal s whose sampling time is 1/60 sec and whose frequency is 50/4 Hz. The frequency of the signal s is divided by 2 by a D-type flip-flop 46, which outputs a switch controlling signal n whose frequency is 50/8 Hz.

If the parallel input terminal PI6 of the shift register 51 is set at the high level and the shift registers 51, 52 are so re-designed to form a 20-bit shift register, a switch controlling signal s whose sampling time is 1/50 sec and whose frequency is 60/4 Hz will then be generated. This signal s may be frequency-divided by 2, to thereby providing a switch controlling signal n whose frequency is 60/8 Hz. Further, if the output of the 20-bit shift register, i.e., the output terminal $b_{24}$ of the shift register 52, is coupled to the serial-in input terminal SI of the shift register 51, it will be sufficient to input data to the register 51 through the parallel input terminals, only once. Thereafter it is unnecessary to input data in parallel fashion.

Figure 13:
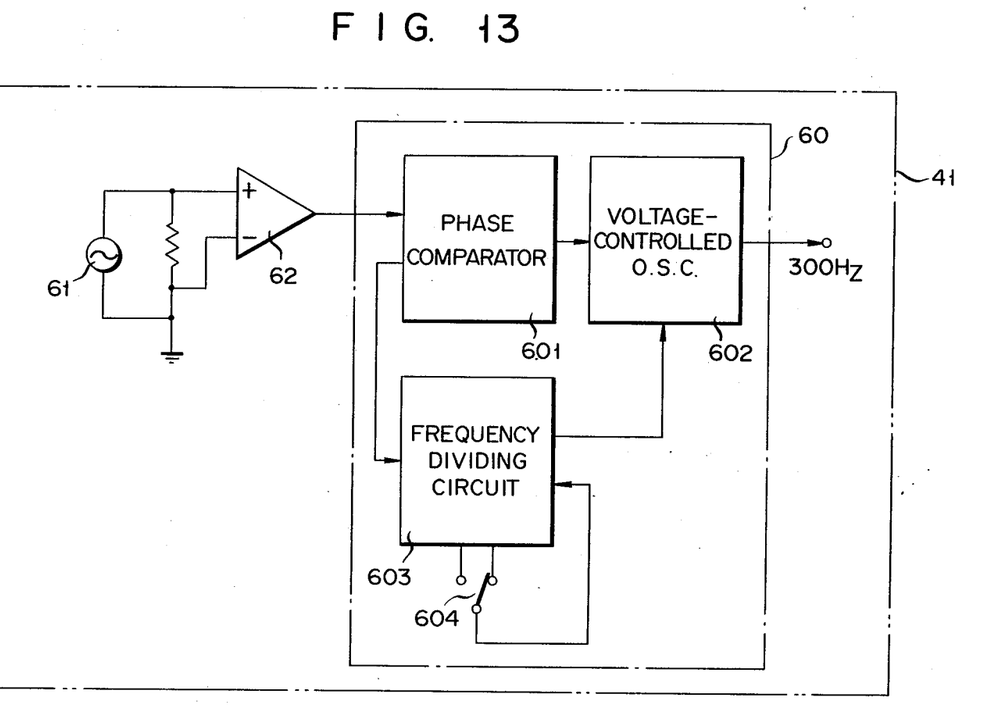
FIG. 13 shows a signal oscillator which may be used in the timing control circuit shown in FIG. 8 or FIG. 12.

FIG. 13 illustrates a signal oscillator 41 including a phase locked loop circuit 60. In this oscillator 41, a comparator 62 compares the output of the commercially available power source 61 with the ground level, thus generating a pulse signal which is synchronous with the AC current from the source 61. The phase locked loop circuit 60 is operated in synchronism with this pulse signal, thereby producing an output signal of 300 Hz. The circuit 60 comprises a phase comparator 601, a voltage-controlled oscillator 602, a frequency dividing circuit 603 and a change-over switch 604. The switch 604 is used to select the frequency division ratio, 1/5 or 1/6, for the frequency dividing circuit 603. Owing to the use of the phase locked loop circuit 60 and the fact that the frequency of the AC current is usually stable, the noise can be perfectly removed.

The frequency of a commercially available AC current is typically not exactly 50 Hz or 60 Hz, but fluctuates a little within an allowable range. Accordingly, the frequency of the exciting current need not be exactly 50 Hz or 60 Hz. It can vary within an allowable frequency range of a commercially available AC current (i.e., a frequency close to the officially-designated frequency). We will define such a frequency to be a commercially available frequency. Also, the sampling time should not exactly be 1/50 s or 1/60 s as long as it is the reciprocal of the commercially available frequency of 50 Hz or 60 Hz.

In most of the embodiments described above, the sampling time is 1/60 sec and the frequency of the exciting current is 50/8 Hz. According to the present invention, however, the sampling period and the frequency of the exciting current are not limited to these. Even in the case where the sampling time is 1/60 sec, the sampling frequency is 50/q, and the frequency of the exciting current is 50/2q, where q is an integer, the noise can be removed whichever commercially available current, 50 Hz-current or 60 Hz-current, is used as exciting current. Similarly, in the case where the sampling time is 1/50 sec, the sampling frequency is 60/q and the frequency of the exciting current is 60/2q, the noise can be removed whichever commercially available current, 50 Hz-current or 60 Hz-current, is used as exciting current.

What is claimed is:

1. An electromagnetic flow meter comprising:
a flow meter main body which receives a first control signal, controls a first switch to produce a square wave exciting current according to the first control signal, supplies the exciting current to an exciting coil for generating a magnetic flux, applies the magnetic flux to an electrically conductive fluid and takes out a voltage, induced in the electrically conductive fluid, as a flow rate signal by using a pair of electrodes;
means having a second switch, which receives the first control signal, amplifies the flow rate signal output from the flow meter main body and a signal obtained by inverting the flow rate signal from the flow meter main body and controls the second switch to select alternately between the amplified flow rate signal and the amplified inverted flow rate signal according to the first control signal every time the direction of the exciting current changes, thus outputting a sample signal;
a pulse width modulation circuit having a third switch, which receives the sample signal and a second control signal, turns the third switch on every time the direction of the exciting current changes so as to sample the sample signal according to the second control signal, and produces a pulse signal with a width corresponding to the sampled value;
a timing control circuit which generates the first control signal to control said first and second switches in such a way that the frequency of the exciting current and the sample signal becomes one of the commercially available frequencies, either 50 Hz or 60 Hz, divided by an even number and generates the second control signal to control said third switch in such a manner that the sampling time for the sampling operation becomes the reciprocal of the other commercially available frequency; and
means which measures the pulse width of the pulse signal produced by the pulse width modulation circuit and detects the flow rate of the electrically conductive fluid based on the measured pulse width.

2. An electromagnetic flow meter according to claim 1, wherein said timing control circuit comprises:
a signal generating section for outputting a signal with the frequency of the least common multiple of the commercially available frequencies of 50 Hz and 60 Hz; and
logic circuit means, coupled to said signal generating section, for frequency-dividing the signal from said signal generating section to produce the first control signal with the commercially available frequency of 50 Hz divided by an even number and the second control signal with the pulse width of the reciprocal of the commercially available frequency of 60 Hz.

3. An electromagnetic flow meter according to claim 1, wherein said timing control circuit comprises:
a signal generating section for outputting a signal with the frequency of the least common multiple of the commercially available frequencies of 50 Hz and 60 Hz; and
logic circuit means, coupled to said signal generating section, for frequency-dividing the signal from said signal generating section to produce the first control signal with the commercially available frequency of 60 Hz divided by an even number and the second control signal with the pulse width of the reciprocal of the commercially available frequency of 50 Hz.

4. An electromagnetic flow meter according to claim 2 or 3, wherein said logic circuit means comprises a frequency dividing circuit including a plurality of flip-flops and designed to divide the frequency of the pulse signal with a predetermined frequency division ratio, a logic circuit for producing the second control signal from the output signals from the respective flip-flops of the frequency dividing circuit, and a flip-flop circuit for dividing the frequency of the second control signal by 2, to thereby produce the first control signal.

5. An electromagnetic flow meter according to claim 2 or 3, wherein said logic circuit means comprises a parallel-in/serial-out, serial-in/serial-out shift register for receiving the pulse signal as a clock signal, an initializing circuit to initialize the shift register in such a manner that the second control signal is produced by the shift register, and a flip-flop circuit for dividing the frequency of the second control signal by 2, to thereby produce the first control signal.

6. An electromagnetic flow meter according to claim 2 or 3, wherein said signal generating section includes a phase locked loop circuit which operates in synchronism with a commercially available AC current, to thereby produce a pulse signal of 300 Hz.

* * * * *